Nov. 1, 1927.  1,647,549
J. P. SMITH
GATE
Filed May 17, 1927  2 Sheets-Sheet 1
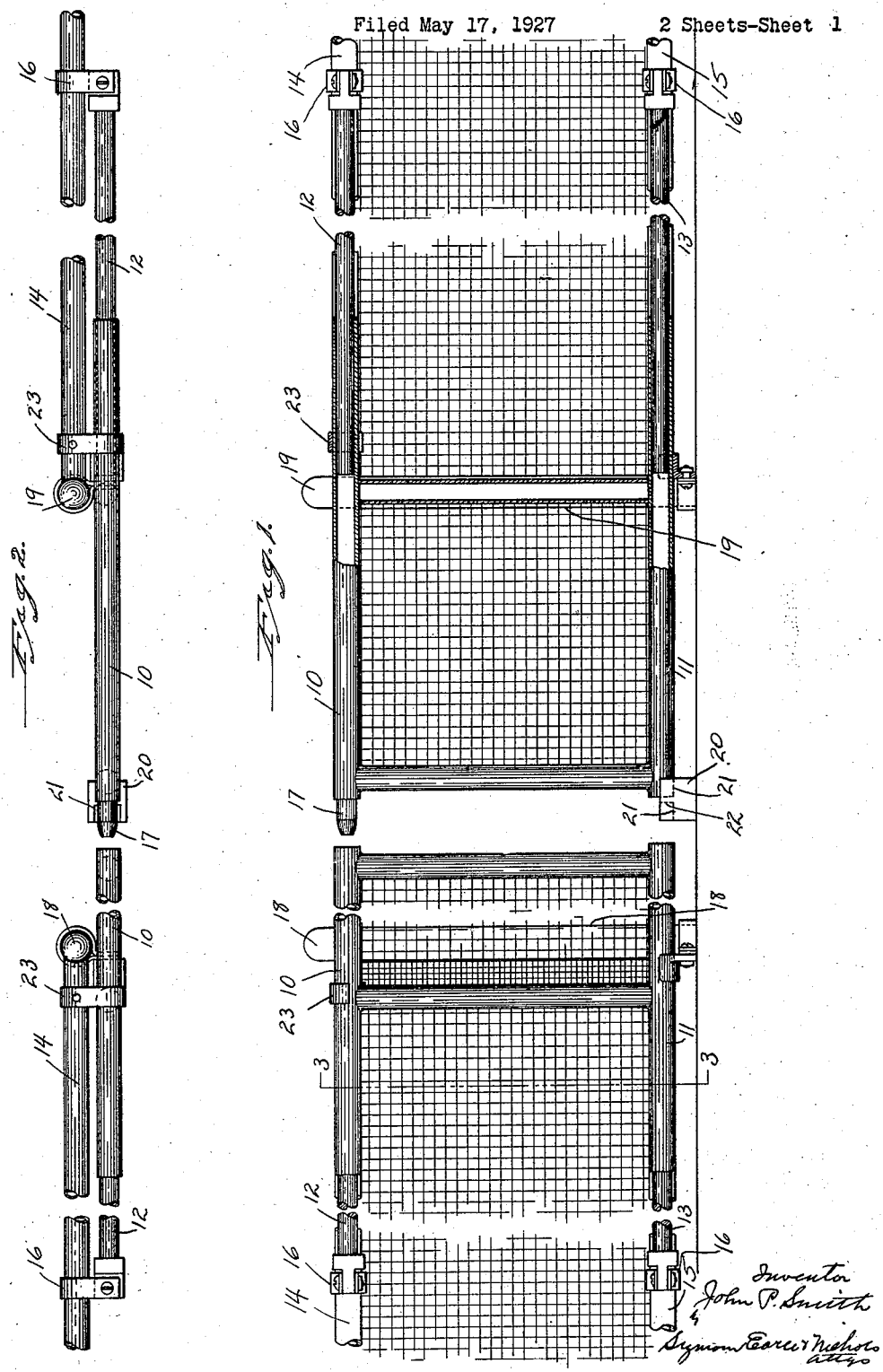

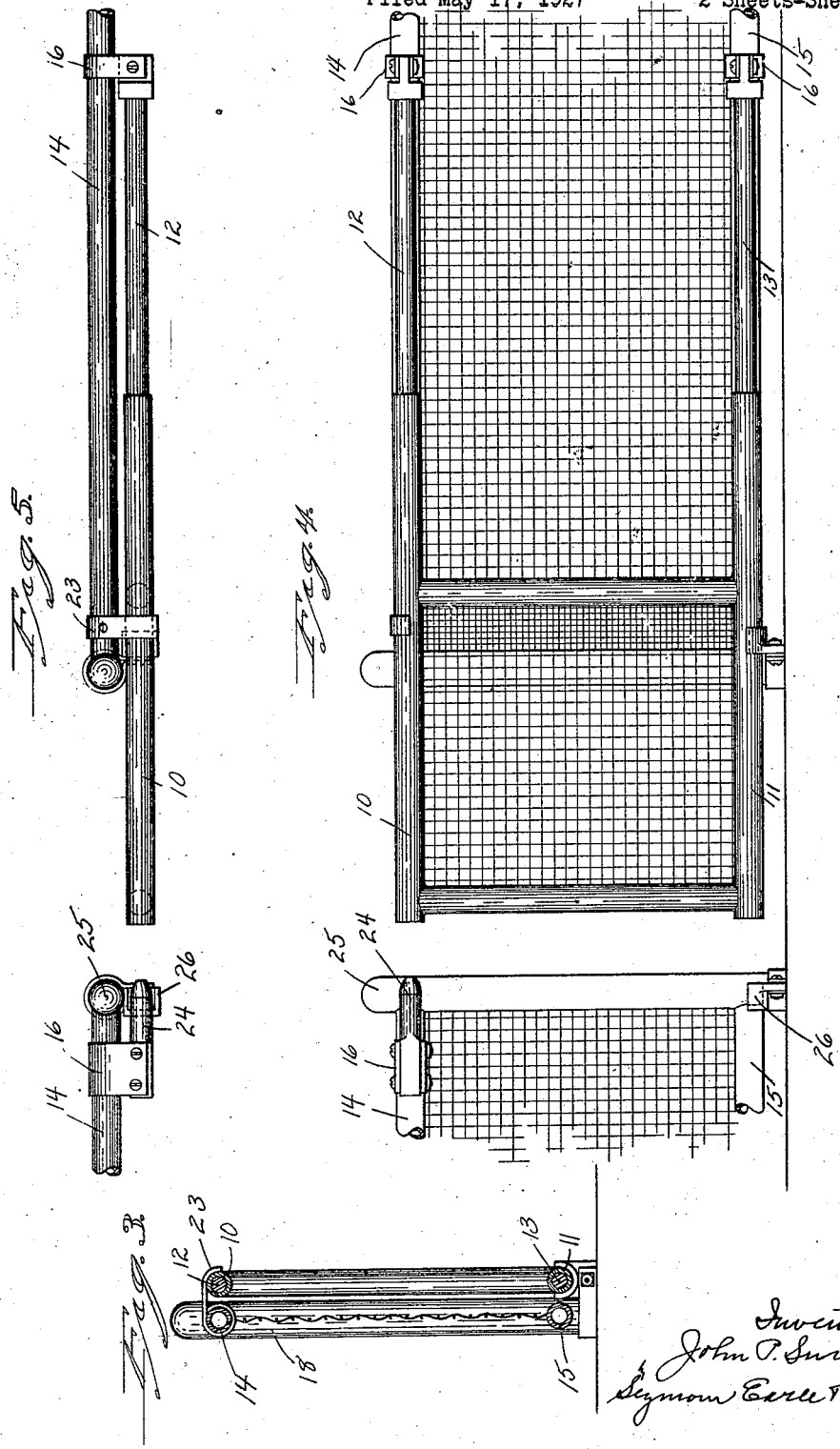

Patented Nov. 1, 1927.

1,647,549

UNITED STATES PATENT OFFICE.

JOHN P. SMITH, OF NEW HAVEN, CONNECTICUT.

GATE.

Application filed May 17, 1927. Serial No. 191,980.

This invention relates to improvement in gates, and particularly to sliding gates, as distinguished from hinged gates, and while particularly adapted for closures for the openings in metal fences, is equally adapted for use where a sliding gate is desired. In the more general construction of sliding gates, they are supported from tracks mounted so high above the ground as to permit passage beneath them. The object of this invention is to mount the gates to slide on rods parallel with the upper and lower rails of a fence, and the invention consists in the construction as hereinafter described and particularly recited in the claims.

In the accompanying drawings:

Fig. 1 is a front view, partly in section, of a two-part gate constructed in accordance with my invention;

Fig. 2 is a top view of the same;

Fig. 3 is a sectional view on the line 3—3 of Fig. 1;

Fig. 4 is a front view of a single gate constructed in accordance with my invention; and Fig. 5 is a top or plan view of the same.

As shown in Figs. 1 and 2 of the drawings, I have illustrated two gates to close driveway openings. The top-bar 10 and lower-bar 11 of each gate is tubular, to slide on top-rods 12 and bottom-rods 13, which are mounted parallel with the top-rails 14 and bottom-rails 15 of a fence. As herein shown, these rods are secured at their outer ends by clips 16. Preferably, the top-bar 10 of one of the gates will be provided with an outwardly-extending stud 17 to enter the tubular top-bar of the other gate, and midway between the gate-posts 18 and 19 is a supporting-block 20 for the lower-bars 11, the block being formed with sockets 21 for the ends of the lower-bars, the sockets being separated by a dividing wall 22, which limits the movement of both gates. To hold the gates in alignment, yokes 23 are fastened to the top-rails of the fence, near the gate-posts and project over the top-bars of the gates. For narrower openings, where only one gate is required, that gate is mounted in the same way as above described, and the tubular top-bar is supported in its closed position by a stud 24 mounted on the top-rail of the fence, near the post 25 and at the bottom of said post is mounted a stop-socket 26. Any suitable device for locking the gates may be provided. Whether one or two gates are employed, they slide upon the top and bottom rails, so as to be moved with little effort, and are properly supported without the use of an overhead-track, and I thus avoid the unsightly appearance of such overhead structure.

I claim:

1. The combination with the top and bottom rails of a fence, of parallel rods mounted thereon, and a gate formed with tubular top and bottom bars adapted to slide over said rods.

2. The combination with the top and bottom rails of a fence, of parallel rods mounted thereon, a gate formed with tubular top and bottom bars adapted to slide over said rods, and a supporting-block for the lower bar.

In testimony whereof, I have signed this specification.

JOHN P. SMITH.